US006023203A

United States Patent [19]

Parish

[11] Patent Number: 6,023,203

[45] Date of Patent: Feb. 8, 2000

[54] RF TEST FIXTURE FOR ADAPTIVE-ANTENNA RADIO SYSTEMS

[75] Inventor: David M. Parish, Los Altos, Calif.

[73] Assignee: ArrayComm, Inc., San Jose, Calif.

[21] Appl. No.: 09/172,790

[22] Filed: Oct. 14, 1998

[51] Int. Cl.[7] .............................. H01P 5/12; H04B 17/00

[52] U.S. Cl. .......................... 333/126; 324/628; 343/703; 455/67.1

[58] Field of Search .................................... 333/125, 126, 333/127, 135, 136, 137, 230; 343/703; 324/628; 455/423–425, 67.1, 67.2, 67.4; 342/1, 3

[56] References Cited

U.S. PATENT DOCUMENTS

| | | | |
|---|---|---|---|
| 4,005,379 | 1/1977 | Lerner | 333/136 |
| 4,035,746 | 7/1977 | Covington, Jr. | 333/127 |
| 4,263,568 | 4/1981 | Nemit | 333/127 |
| 4,375,622 | 3/1983 | Hollingsworth et al. | 333/126 |
| 5,109,535 | 4/1992 | Kume et al. | 455/67.4 |
| 5,142,253 | 8/1992 | Mallavarpu et al. | 333/127 |
| 5,283,540 | 2/1994 | Myer | 333/127 |
| 5,423,072 | 6/1995 | Iwashita et al. | 343/703 X |
| 5,440,281 | 8/1995 | Wey et al. | 333/126 |
| 5,457,812 | 10/1995 | Siira et al. | 455/67.4 |
| 5,689,219 | 11/1997 | Piirainen | 333/127 |

*Primary Examiner*—Paul Gensler
*Attorney, Agent, or Firm*—Townsend and Townsend and Crew LLP; Henry K. Woodward; Dov Rosenfeld

[57] ABSTRACT

An RF-signal combiner-splitter comprises a microwave cavity that is intended to mix together radio signals in the 2.0 GHz spectrum. A hollow cylindrical metal tube with a volume of a few cubic feet to a few cubic yards is closed at one end and open at the other. Many RF-ports into the microwave cavity are provided at random positions that penetrate the hollow cylindrical metal tube. For example BNC-type bulkhead connectors with 10 dB attenuator pads are used with a 2 to 3 inch whip antenna inside the cavity volume. The attenuator pads brute-force an impedance match between the radio equipment under test and their corresponding RF-ports. The open end of the hollow cylindrical metal tube allows for the quick decay of RF-reflections that reverberate inside the cavity volume. Such open end is preferably directed toward nadir because interfering signals are generally minimum from that direction. In alternative embodiments, the cavity volume is partially filled with an RF-absorbing foam or other material to control reflections and limit the RF-energy within.

11 Claims, 2 Drawing Sheets

RF TEST FIXTURE FOR ADAPTIVE-ANTENNA RADIO SYSTEMS

FIELD OF THE INVENTION

The invention relates generally to the manufacturing and test of radio-communication systems, and more specifically to radio-frequency splitter-combiner test fixtures that permit consistent pseudo-spatial relationships to be electrically simulated, for example for testing smart-antenna based base station transceivers and remote units for cellular telephone and other communications services applications.

DESCRIPTION OF THE PRIOR ART

Modern radio systems may be analog or digital, and many standards exist for the protocols. Such radio systems include cellular wireless communication systems. Analog systems typically use frequency division multiple access (FDMA) techniques. Digital systems typically use FDMA techniques, time division multiple access (TDMA) techniques, a combination of TDMA with FDMA (TDMA/FDMA), or code division multiple access (CDMA) techniques. For example, with an FDMA/TDMA system, each frequency channel is divided into timeslots. In a CDMA system, each channel is assigned a particular spread spectrum code. Duplexing (two-way communication) may use time division duplexing (TDD) where some of the timeslots within a frequency channel are used for the downlink (base station to subscriber unit) and others within the same frequency channel for the uplink. Frequency division duplexing (FDD) also is possible wherein uplink and downlink communication occur in different frequency channels, as is code division duplexing.

Recently, smart antenna based systems have been introduced. Smart antenna base stations use a plurality of antenna elements (an array of antenna elements), instead of a single antenna element, together with spatial processing. Spatial processing of the antenna signals provides several signal quality advantages, providing for increased cell-phone capacity in each cell and allowing more cells in a given area. In some cases, smart antenna systems enable simultaneous communications over the same "conventional channel" this sometimes called spatial division multiple access (SDMA). A conventional channel is a frequency, time, or code channel or a combination of these. Spatial processing includes weighting each of the signals received or transmitted from or to each of the antenna elements by an amplitude and phase weight (combined as a complex valued weight vector). The best weight to use to, or from, a particular user may be determined by each user's "spatial signature" which is a function of the position location of that user. The receive spatial signature of a transmitting subscriber unit characterizes how the base station antenna array receives signals from the subscriber unit in a particular channel while the transmit spatial signature characterizes how the subscriber unit receives signals from each element of the antenna array at the base station in a channel. See U.S. Pat. No. 5,592,490 to Barratt et al. The weights may be combined to form a complex valued weight vector. A different weight vector is used for transmitting from a base station and receiving at the base station. The adaptive weighting can null-out interference signals that come from directions different from the signals of interest. Transmit nulls can also be adaptively directed to minimize inter-cell interference and inter-channel interference between adjacent cell base stations. More cells in the same area means the overall capacity of many telecommunication services can be increased. This is especially crucial for personal communication system (PCS) and other cellular services in urban areas. For suburban and rural areas, the use of adaptive antennas can easily extend the communication range such that fewer cells can provide strong signal levels where needed. Since adaptive antenna received sensitivity can be better, handsets could be allowed to transmit at lower power for battery life.

While smart antenna systems with spatial processing allow for SDMA—that is, more than one "spatial channel" per conventional channel—many of the advantages are still available even with one spatial channel per conventional channel.

The manufacturing and test of transceiving equipment capable of spatial processing and adaptive antenna array connections is very challenging. Adaptive antenna systems require the development and test of hardware and software that can use the spatial signatures of signals received from outlying mobile units, and then formulate weight combinations for their own antenna array to direct signal-strength lobes or nulls in advantageous directions. A cellular base station capable of doing such a job could use many antennas in its array and would be expected to deal with a hundred or more mobile subscriber units that have a wide variety of possible placements and movements, including random or random-like placements and movements.

Conventional radio-test equipment is too expensive and ill-suited to make the construction of such complex (e.g. 12-by-150 combiner-splitters) practical. Larger, more complex combinations are all the more unattainable. Nevertheless, various combiner-splitters have been described in the prior art. For example, U.S. Pat. No. 4,035,746, issued Jul. 12, 1977 to Martin Covington, Jr., describes a broadband concentric power combiner or divider for use with microwave frequency signals in the form of a multi-section folded transmission line. The folded transmission line has a plurality of concentric cylinders such that the outer conductor of one section comprises the inner conductor of an adjacent section, and the various cylinders are conductors. An "R. F. POWER DISTRIBUTION NETWORK FOR PHASED ANTENNA ARRAY" is described by David Lerner in U.S. Pat. No. 4,005,379, issued Jan. 25, 1977. A TEM-mode and a pair of selectively phase-shifted $TE_{11}$ modes are derived and applied to the input ports of a cavity resonator to produce a desired RF-power distribution at a plurality of output ports in an RF-power distribution network or scanner. The resonator is a cylindrical member in which the output ports are arranged circumferentially about the periphery and axially spaced from the $TE_{11}$ mode input ports and are symmetrically arranged about the TEM mode input port.

The alternative of conducting tests in free-space is also not practical because too little control can be maintained over the day-to-day placement of the constellation, repeatable standardized configurations are near impossible to realize, nearby extraneous interference can inject test aberrations and distort factory-acceptance results, and the configuration itself would radiate signals that could interfere with other services or users and therefore be prohibited by law.

SUMMARY OF THE PRESENT INVENTION

It is therefore an object of the present invention to provide an RF-signal combiner-splitter with as realistic a RF-environment as possible and without sacrificing the stability or control of the complex way the various ports mix together.

It is another object of the present invention to provide a test and laboratory fixture that provides enough long-term and short-term stability that factory acceptance tests of radio components can be done with ease.

It is a further object of the present invention to provide an RF-signal combiner-splitter that may be used to compare and benchmark the performance of one adaptive antenna weighting algorithm versus another while being able to control the spatial signatures of every participant in each test.

Briefly, an RF-signal combiner-splitter embodiment of the present invention comprises a microwave cavity that is intended to mix together radio signals in the particular frequency range, the 2.0 GHz spectrum in the preferred embodiment. Other implementations would work for different frequency ranges. A hollow cylindrical metal tube with a volume of a few cubic feet to a few cubic yards is closed at one end and open at the other. Many RF-ports into the microwave cavity are provided at a set of positions, typically random positions that penetrate the hollow cylindrical metal tube. For example BNC-type bulkhead connectors with 10 dB attenuator pads are used with a 2- to 3-inch whip antenna inside the cavity volume. The attenuator pads brute-force an impedance match between the radio equipment under test and their corresponding RF-ports. The open end of the hollow cylindrical metal tube allows for the quick decay of RF-reflections that reverberate inside the cavity volume. Such open end is preferably directed toward nadir because interfering signals are generally minimum from that direction. In alternative embodiments, the cavity volume is partially filled with an RF-absorbing foam or other material to control reflections and limit the RF-energy within.

An advantage of the present invention is that an RF-signal combiner-splitter is provided in which near-field propagation in space is used as a mixing mode and very realistic spatial signatures are discernible by adaptive antenna equipped radio units under test.

Another advantage of the present invention is that an RF-signal combiner-splitter is provided in which the day-to-day variations in the way RF-signals mix inside can be controlled over the period of months.

A further advantage of the present invention is that an RF-signal combiner-splitter is provided that is simple, inexpensive to construct, and easy to use.

A still further advantage of the present invention is that an RF-signal combiner-splitter is provided that can have its individual ports characterized by their spatial signatures and thus allow the benchmarking of competing hardware and software radio communication solutions.

These and other objects and advantages of the present invention will no doubt become obvious to those of ordinary skill in the art after having read the following detailed description of the preferred embodiment which is illustrated in the drawing figures.

IN THE DRAWINGS

FIG. 1 is a schematic diagram of an RF-signal combiner-splitter embodiment of the present invention; and FIG. 2 is an perspective diagram of the an RF-signal combiner-splitter of FIG. 1.

DETAILED DESCRIPTION OF THE PREFERRED EMBODIMENTS

The preferred embodiments of the present invention are implemented in an RF-signal combiner-splitter. It will be clear to those of ordinary skill in the art that a number of variations on the same theme are possible given the variety of RF-components available to the artisan.

Figure 1:
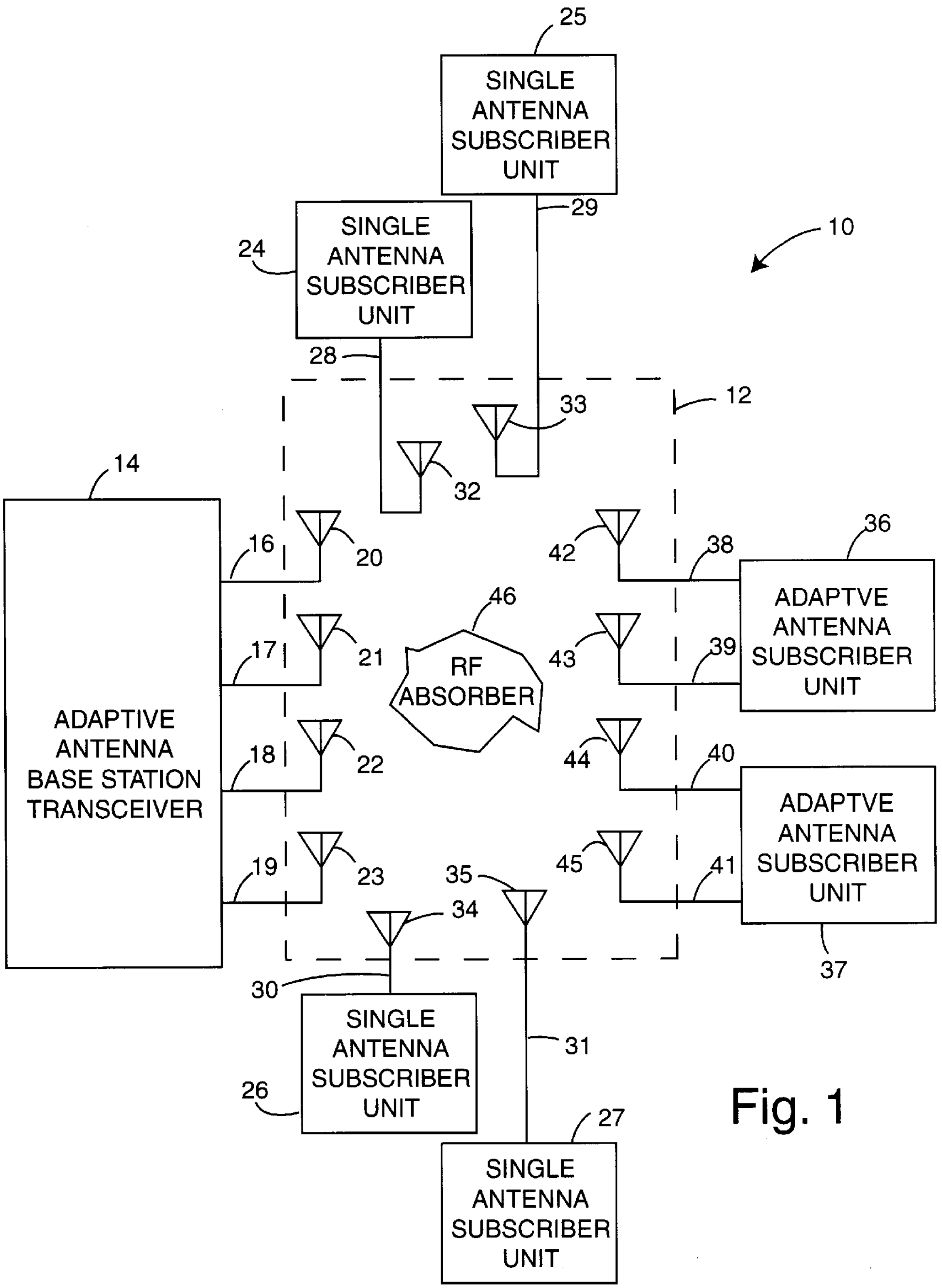

FIG. 1 illustrates an RF-signal combiner-splitter embodiment of the present invention, referred to herein by the general reference numeral 10. The RF-signal combiner-splitter 10 comprises a microwave cavity 12 that is intended to mix together radio signals. For example, a prototype was constructed to mix together RF-signals in the 2.0 GHz spectrum for adaptive-antenna cellular telephone base stations and subscriber units. The microwave cavity 12 can be constructed of a hollow cylindrical metal tube with a volume of a few cubic feet to a few cubic yards is closed at one end and open at the other. In the prototype mentioned, sheet-metal heating duct was used with cylinder diameters of 16 to 30 inches. Such prototype had semi-flexible walls which could cause variations in the way RF-signals mixed inside as the walls were deformed. In some applications where it is important that the RF-signal mixing characteristics not change between ports, the microwave cavity 12 should be constructed of a more rigid material.

Many RF-ports into the microwave cavity are provided at lots of positions, for example, random positions, that penetrate the hollow cylindrical metal tube. An adaptive-antenna base-transceiver 14 could require as many as a dozen antennas in an array to be able to direct lobes and nulls at various mobile subscriber units as they move about a cell area. These are represented in FIG. 1 by asset of coaxial cables 16–19 connected to a corresponding array of antennas 20–23. In the prototypes that have been constructed, BNC-type bulkhead connectors with 10 dB attenuator pads were used with a 2 to 3 inch whip antenna inside the cavity volume. Such attenuator pads were needed to "brute-force" an impedance match between the radio equipment under test and their corresponding RF-ports. Alternatively, the antennas could be carefully cut or tuned to minimize the virtual standing wave ratio (VSWR) and thereby present a proper load impedance with minimal RF-leakage.

A couple of single-antenna subscriber units are represented in FIG. 1 as transceivers 24–27 connected by cables 28–30 to antennas 32–35. Each antenna 32–35 presents a different spatial signature to each and every grouping of the other antennas within the microwave cavity 12. Such spatial signatures are of particular interest to the adaptive-antenna base-transceiver 14 and are encoded in the complex of individual signals obtained from the antenna array 20–23.

Such a situation is therefore able to exercise the ability of the adaptive-antenna base-transceiver 14 to dynamically direct transmitter or receiver directional lobes and nulls relative to the antennas 32 and 33. The different spatial placements of each antenna 20–23 allow each to provide its own spatial perspective on the signals received from any one particular source. The antennas 20–23, as do the others in the microwave cavity 12, have a phase and amplitude relationship that can be exploited while transmitting signals. The phase relationship can be random, but must be stable long enough for the adaptive-antenna mechanisms to learn how different transmitter signal strengths to each antenna 20–23 affects the reception signal strength at various target receivers. Such learning can be by many methods, a priori, or derived from the spatial signatures of received signals. See U.S. Pat. No. 5,592,490 to Barratt et al. for an example.

The open end of the hollow cylindrical metal tube allows for the quick decay of RF-reflections that reverberate inside the cavity volume. Such open end is preferably directed toward nadir because interfering signals are generally minimum from that direction. In alternative embodiments, the cavity volume is partially filled with an RF-absorbing foam or other material to control reflections and limit the RF-energy within.

The fact that as many as a few hundred more subscriber units or other radio participants can preferably participate in the test setup of FIG. 1 is further represented by a pair of adaptive-antenna mobile-transceivers 36 and 37 connected by a plurality of cables 38–41 to a corresponding set of antenna arrays 42–45. A radio-absorber 46 may be included and sized to control the RF-energy levels and RF-reflection decay rates of the microwave cavity 12.

Figure 2:
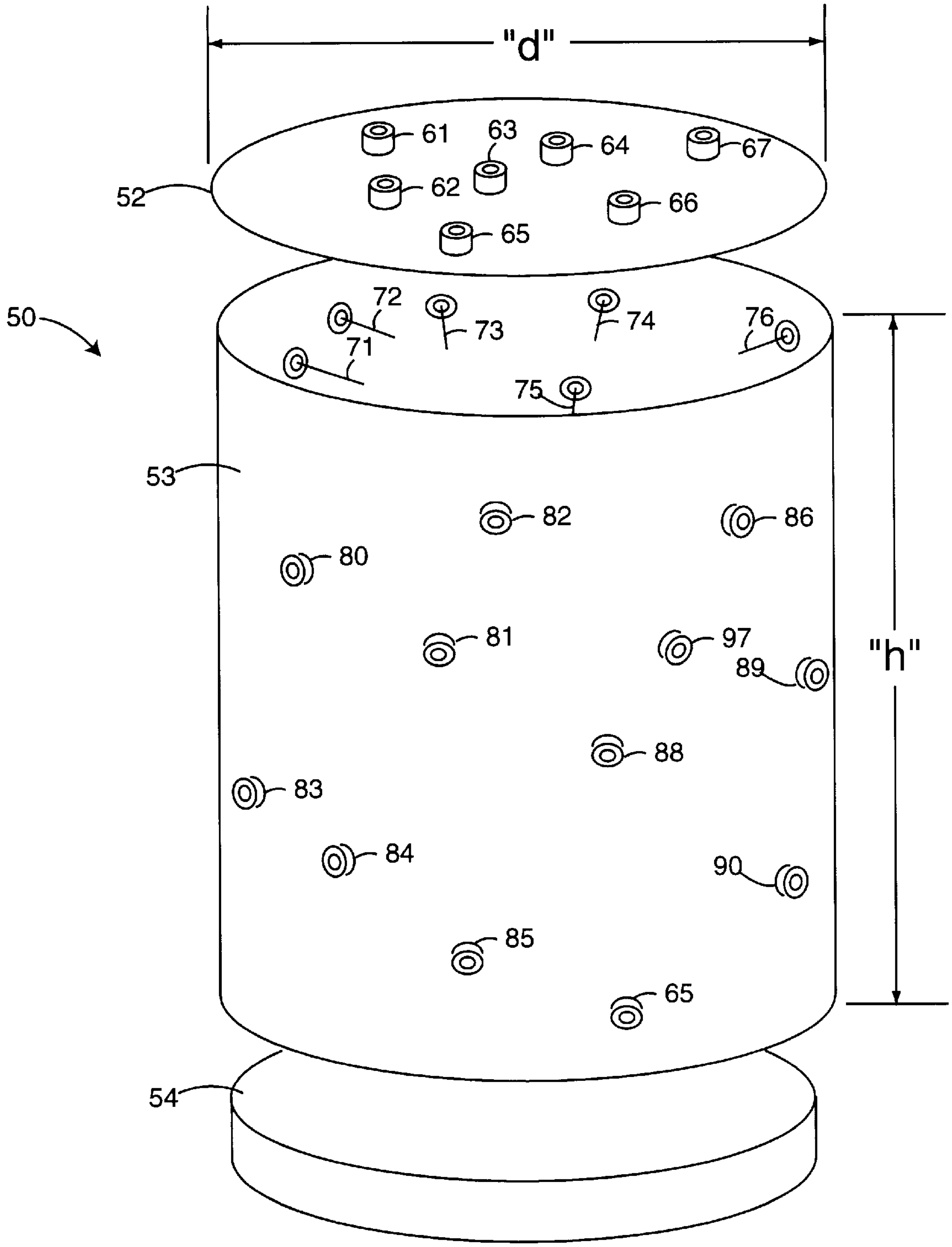

FIG. 2 diagrams a way that the RF combiner-splitter 10 of FIG. 1 could be realized in a practical embodiment. A test fixture 50 comprises a top sheet-metal plate 52 that is joined along a conductive seam to a hollow sheet-metal cylinder 53 with a diameter "d" and a height "h". A prototype in which "d" was about 30 inches and "H" was about 50 inches, provided good results. The cavity formed within is the equivalent of microwave cavity 12 (FIG. 1). Just about any shape or volume for the cavity can be used by the present invention. The cylinder shape shown in FIG. 2 is easy and practical to build with standard metal pipe and sheet-metal ducting. Cubic, spherical, and even oval metal tanks would be useful too. Whole rooms with conductive coatings on the walls are another alternative.

A radio-absorbing cake 54 is used to plug or fill the bottom of the hollow sheet-metal cylinder 53. Alternatively, the hollow sheet-metal cylinder 53 make be completely closed up by a bottom sheet-metal plate that is the complement to the top sheet-metal plate 52.

Radio equipment under test or development is simply cable-connected to the test fixture 50 according to a standardized procedure. A population of BNC-type bulkhead connectors 61–67 represent some of the RF-ports that can be provided on the top sheet-metal plate 52. Each of these has an antenna whip which is similar to antenna whips 71–76 inside the volume of the hollow sheet-metal cylinder 53. Another population of BNC-type bulkhead connectors 80–90 represent the bulk of the RF-ports that are provided on hollow sheet-metal cylinder 53. These too would have the antenna whips inside, e.g., the visible examples of antenna whips 71–76.

The placement and position of each RF-port and the angle of whip antenna can be at a pre-determined set of locations and angles, or can be random (including random-like). Indeed, such randomness can help simulate a more realistic radio-environment.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A radio-frequency combiner-splitter, comprising:

(a) a microwave cavity with an internal volume generally enclosed by a conductive skin;

(b) a plurality of radio-frequency access ports placed at a set of locations and penetrating said conductive skin; and (c) a corresponding plurality of antennas each associated with individuals of said plurality of radio-frequency access ports and providing for near-field free-space intercommunication of radio signals within said internal volume amongst said radio-frequency access ports;

wherein, individual members of the plurality of radio-frequency access ports are associated in groups, and any particular radio-frequency access port of the plurality of radio-frequency access ports presents a spatial signature to any grouping of the plurality of radio-frequency access ports that does not include the particular radio-frequency access port, and said spatial signatures occurring as a result of the particular way the plurality of radio-frequency access ports have been placed.

2. The radio-frequency combiner-splitter of claim 1, wherein:

the microwave cavity includes an opening that provides for control of the direction and energy-level of escaping radio-frequency reflections.

3. The radio-frequency combiner-splitter of claim 1, wherein:

the set of locations is a set of randomly distributed locations.

4. The radio-frequency combiner-splitter of claim 1, wherein:

the microwave cavity has an internal volume on the order of a few cubic feet to a few cubic yards and is constructed of sheet metal.

5. The radio-frequency combiner-splitter of claim 1, wherein:

the plurality of radio-frequency access ports are divided into groups and associated with individual adaptive-antenna radio communication hardware or software.

6. The radio-frequency combiner-splitter of claim 1, wherein:

the corresponding plurality of antennas each comprise a whip antenna that is impedance matched to its corresponding one of the plurality of radio-frequency access ports and have a set of orientations.

7. The radio-frequency combiner-splitter of claim 6, wherein:

the set of orientations is a set of randomly distributed orientations.

8. The radio-frequency combiner-splitter of claim 1, wherein:

the corresponding plurality of antennas each comprise a whip antenna with an orientation of a set of orientations and that is not impedance matched to its corresponding one of the plurality of radio-frequency access ports; and each member of the plurality of radio-frequency access ports further includes an attenuator to brute-force match external equipment to corresponding antennas.

9. The radio-frequency combiner-splitter of claim 8, wherein:

the set of orientations is a set of randomly distributed orientations.

10. The radio-frequency combiner-splitter of claim 1, wherein:

the microwave cavity includes in its internal volume a radio-frequency absorber material to control and reduce internal RF-energies and reflections.

11. The radio-frequency combiner-splitter of claim 1, wherein:

the plurality of radio-frequency access ports are associated in groups which are characterized by the spatial signatures that occur, and are thereafter used to benchmark communication hardware or software which depends on adaptive-antenna operation.

* * * * *